US012558971B2

(12) United States Patent
Mawardi et al.

(10) Patent No.: US 12,558,971 B2
(45) Date of Patent: Feb. 24, 2026

(54) PHYSICS-BASED DIMENSION REDUCTION STRATEGIES FOR ONLINE TORQUE OPTIMIZATION IN ELECTRIFIED VEHICLES

(71) Applicant: FCA US LLC, Auburn Hills, MI (US)

(72) Inventors: Andryas Mawardi, Rochester, MI (US); Szabolcs Sovenyi, Bloomfield Hills, MI (US); McKenzie T Walsh, Auburn Hills, MI (US); Krishna Madireddy, Troy, MI (US); Nadirsh Patel, Auburn, MI (US)

(73) Assignee: FCA US LLC, Auburn Hills, MI (US)

( * ) Notice: Subject to any disclaimer, the term of this patent is extended or adjusted under 35 U.S.C. 154(b) by 185 days.

(21) Appl. No.: 18/590,094

(22) Filed: Feb. 28, 2024

(65) Prior Publication Data

US 2025/0269737 A1    Aug. 28, 2025

(51) Int. Cl.
B60L 15/20 (2006.01)
B60L 50/62 (2019.01)

(52) U.S. Cl.
CPC ........... B60L 15/2045 (2013.01); B60L 50/62 (2019.02); B60L 2240/423 (2013.01); B60L 2260/54 (2013.01)

(58) Field of Classification Search
USPC .......................................................... 701/22
See application file for complete search history.

(56) References Cited

U.S. PATENT DOCUMENTS

| | | | | | |
|---|---|---|---|---|---|
| 7,154,236 | B1 * | 12/2006 | Heap | ...................... | B60W 20/11 |
| | | | | | 180/65.265 |
| 8,285,462 | B2 * | 10/2012 | Heap | .................... | B60W 10/115 |
| | | | | | 701/55 |
| 8,412,426 | B2 * | 4/2013 | Sah | ........................ | B60K 6/445 |
| | | | | | 701/67 |
| 2021/0031634 | A1 * | 2/2021 | Erbey | ...................... | B60L 7/10 |
| 2022/0227239 | A1 * | 7/2022 | Maady | .................... | B60L 58/14 |

FOREIGN PATENT DOCUMENTS

| | | |
|---|---|---|
| CN | 111645536 A | 9/2020 |
| CN | 219487156 U | 8/2023 |

* cited by examiner

*Primary Examiner* — Adam D Tissot
(74) *Attorney, Agent, or Firm* — Jeremy J. Klobucar

(57) ABSTRACT

A torque optimization system for an electrified vehicle having an electrified powertrain including three electric motors a, b, and c and an additional torque generating system includes a set of sensors configured to measure a set of operating parameters of the electrified vehicle and a control system configured to determine a torque relationship between electric motors b and c, solving a three-dimensional (3D) optimization problem for the electrified powertrain, the 3D optimization problem defining torques generatable by one of electric motors b and c, electric motor a, and the additional torque generating system, determine torque commands for the three electric motors a, b, and c and the torque generating system based on the solving of the 3D optimization problem, the determined torque relationship, and the set of operating parameters, and control the electrified powertrain based on the determined torque commands.

18 Claims, 7 Drawing Sheets

PHYSICS-BASED DIMENSION REDUCTION STRATEGIES FOR ONLINE TORQUE OPTIMIZATION IN ELECTRIFIED VEHICLES

FIELD

The present application generally relates to electrified vehicles and, more particularly, to physics-based dimension reduction strategies for online torque optimization in electrified vehicles.

BACKGROUND

A range-extended electrified vehicle (REEV) includes at least one electric traction motor that is powered by a battery system and that generates propulsive drive torque and an internal combustion engine that is configured to generate mechanical energy, which is converted into electrical energy via another electric motor of a motor-generator unit (MGU) for recharging the battery system. Conventional optimized torque control systems for REEVs are designed for a three-dimensional (3D) optimization problem, i.e., an engine and two electric motors. Some REEVs, however, include three electric motors, such as REEVs including separate electric traction motors on front and rear axles, respectively. In these cases, optimized torque control becomes a four-dimensional (4D) optimization problem, which is much more difficult to solve and could require more substantial processing power than is typically available. Accordingly, while such conventional REEV optimized torque control systems do work for their intended purpose, there exists an opportunity for improvement in the relevant art.

SUMMARY

According to one example aspect of the invention, a torque optimization system for an electrified vehicle having an electrified powertrain including three electric motors a, b, and c and an additional torque generating system is presented. In one exemplary implementation, the torque optimization system comprises a set of sensors configured to measure a set of operating parameters of the electrified vehicle and a control system configured to determine a torque relationship between electric motors b and c, solving a three-dimensional (3D) optimization problem for the electrified powertrain, the 3D optimization problem defining torques generatable by one of electric motors b and c, electric motor a, and the additional torque generating system, determine torque commands for the three electric motors a, b, and c and the torque generating system based on the solving of the 3D optimization problem, the determined torque relationship, and the set of operating parameters, and control the electrified powertrain based on the determined torque commands.

In some implementations, the 3D optimization problem is reduced from a four-dimensional (4D) optimization problem for the electrified powertrain, the 4D optimization problem defining torques generatable by the three electric motors a, b, and c and the additional torque generating system. In some implementations, the torque relationship is defined by the following equation:

$$Tc = M*Tb + N,$$

where M and N represent a scalar coefficient and a scalar constant, respectively, for the torque relationship between a torque Tb of electric motor b and a torque c of electric motor c. In some implementations, the control system is configured to determine the torque relationship by determining values for M and N.

In some implementations, the electrified vehicle is a range-extended electrified vehicle (REEV) and the additional torque generating system of the electrified powertrain is an internal combustion engine having electric motor a associated therewith as part of a motor/generator unit (MGU). In some implementations, electric motors b and c are two separate electric traction motors associated with separate front and rear axles of the REEV. In some implementations, the additional torque generating system of the electrified powertrain is another electric motor. In some implementations, the electrified powertrain includes one electric motor associated with each of four wheels of the electrified vehicle.

According to another example aspect of the invention, a torque optimization method for an electrified vehicle having an electrified powertrain including three electric motors a, b, and c and an additional torque generating system is presented. In one exemplary implementation, the torque optimization system comprises receiving, by a control system and from a set of sensors, a set of operating parameters of the electrified vehicle, determining, by the control system, a torque relationship between electric motors b and c, solving, by the control system, a 3D optimization problem for the electrified powertrain, the 3D optimization problem defining torques generatable by one of electric motors b and c, electric motor a, and the additional torque generating system, determining, by the control system, torque commands for the three electric motors a, b, and c and the torque generating system based on the solving of the 3D optimization problem, the determined torque relationship, and the set of operating parameters, and controlling, by the control system, the electrified powertrain based on the determined torque commands.

In some implementations, the 3D optimization problem is reduced from a 4D optimization problem for the electrified powertrain, the 4D optimization problem defining torques generatable by the three electric motors a, b, and c and the additional torque generating system. In some implementations, the torque relationship is defined by the following equation:

$$Tc = M*Tb + N,$$

where M and N represent a scalar coefficient and a scalar constant, respectively, for the torque relationship between a torque Tb of electric motor b and a torque c of electric motor c. In some implementations, determining the torque relationship comprises determining, by the control system, values for M and N.

In some implementations, the electrified vehicle is an REEV and the additional torque generating system of the electrified powertrain is an internal combustion engine having electric motor a associated therewith as part of an MGU. In some implementations, electric motors b and c are two separate electric traction motors associated with separate front and rear axles of the REEV. In some implementations, the additional torque generating system of the electrified powertrain is another electric motor. In some implementations, the electrified powertrain includes one electric motor associated with each of four wheels of the electrified vehicle.

According to another aspect of the invention, a torque optimization system for an REEV having an electrified powertrain including an internal combustion engine and three electric motors a, b, and c is presented. In one exemplary implementation, the torque optimization system comprises a set of sensors configured to measure a set of operating parameters of the REEV and a control system configured to reduce a 4D optimization problem for the electrified powertrain to a 3D optimization problem, the 4D optimization problem defining torques generatable by the three electric motors a, b, and c and engine, wherein the reducing comprises determining modified battery power constraints representing two concentric circles having respective radii that define possible torques for electric motors b and c, solve the 3D optimization problem by modifying the radii based on a known torque for electric motor a, wherein electric motor a is associated with the engine, determine torque commands for the electric motors b and c and the engine based on the solving of the 3D optimization problem and the set of operating parameters and determine a torque command for electric motor a, and control the electrified powertrain based on the determined torque commands.

In some implementations the 4D torque optimization problem is defined as follows:

$$\max(C_{OBJ}), \text{ where}$$

$$C_{OBJ} = f_{OBJ}(Ta, Tb, Tc, Ti) = k_{Ta,o}{*}Ta + k_{Tb,o}{*}Tb + k_{Tc,o}{*}Tc + k_{Ti,o}{*}Ti + D,$$

where $k_{Ta,o}$, $k_{Tb,o}$, $k_{Tc,o}$, and $k_{Ti,o}$ are known scalar coefficients and D is a known scalar constant, and where $f_{OBJ}$ represents an objective function, Ta, Tb, and Tc represent the torques of the electric motors a, b and c, respectively, and Ti represents the torque of the engine i.

In some implementations, the 4D torque optimization problem also includes two imposed non-linear minimum/maximum battery power constraints that relate electric motor torque to battery power:

$$\text{PBatMin} = Pa + Pb + Pc + \text{DCLoad, and}$$

$$\text{PBatMax} = Pa + Pb + Pc + \text{DCLoad, where}$$

$$Pa = (A_1{*}Ta + A_2)^2 + C_a,$$

$$Pb = (B_1{*}Tb + B_2)^2 + C_b, \text{ and}$$

$$Pc = (C_1{*}Tc + C_2)^2 + C_c,$$

where DCLoad represents power consumed by REEV accessories and coefficients $A_1$, $A_2$, $C_a$, $B_1$, $B_2$, $C_b$, $C_1$, $C_2$, and $C_c$ are determined empirically from electric motor loss maps.

In some implementations, the reduction of the 4D torque optimization problem comprises utilizing a known coordinate for motor torque Ta:

$$Ta_{Min,n} = (Tm_{min,n} - C_n)/k_{Ta,n}, \text{ and}$$

$$Ta_{Max,n} = (Tm_{max,n} - C_n)/k_{Ta,n},$$

to determine the following:

$$Pa_{Min,n} = (A_1{*}\text{TForPBatMin} + A_2)^2 + C_a, \text{ and}$$

$$Pa_{Max,n} = (A_1{*}\text{TForPBatMax} + A_2)^2 + C_a,$$

where:

$$\text{TForPBatmin} = \max(\min(\max(Ta_{Min,n}, Ta_{max,n}), Ta_{Max}), Ta_{Min}), \text{ and}$$

$$\text{TForPBatMax} = (\min(\max(\min(Ta_{Min,n}, Ta_{Max,n}), Ta_{Min}), Ta_{Max}).$$

In some implementations, the reduction of the 4D torque optimization problem further comprises removing motor powers $Pa_{Min,n}$ and $Pa_{Max,n}$ from the two imposed battery power constraints to obtain modified battery power constraints PBatMinMod and PBatMaxMod as follows:

$$Pa_{ForPBatMax} = \min(Pa_{Min,n}, Pa_{Man,n}),$$

$$Pa_{ForPBatMin} = \max(Pa_{Min,n}, Pa_{Max,n}),$$

$$\text{PBatMinMod} = \text{PBatMin} - Pa_{ForPBatMin}, \text{ and}$$

$$\text{PBatMaxMod} = \text{PBatMax} - Pa_{ForPBatMax}.$$

In some implementations, the modified battery power constraints represent the two concentric circles having radii RMinMod and RMaxMod defined as follows:

$$\text{RMinMod} = \sqrt{[\max(0, \text{PBatMin} - Pa_{ForPBatMin} - Cb - Cc - \text{DCLoad}]}, \text{ and}$$

$$\text{RMaxMod} = \sqrt{[\max(0, \text{PBatMax} - Pa_{ForPBatMax} - Cb - Cc - \text{DCLoad}]}.$$

In some implementations, the objective function $f_{OBJ}$ nor the other constraints are a function of the known coordinate for motor torque Ta such that the modified battery power constraints would be affected. In some implementations, electric motor a is part of an MGU connected to the engine and electric motors b and c are separate electric traction motors. In some implementations, the separate electric traction motors b and c are associated with separate front and rear axles of the REEV.

According to another aspect of the invention, a torque optimization method for an REEV having an electrified powertrain including an internal combustion engine and three electric motors a, b, and c is presented. In one exemplary implementation, the torque optimization method comprises receiving, by a control system and from a set of sensors, a set of operating parameters of the REEV, reducing, by the control system, 4D optimization problem for the electrified powertrain to a 3D optimization problem, the 4D optimization problem defining torques generatable by the three electric motors a, b, and c and engine, wherein the reducing comprises determining modified battery power constraints representing two concentric circles having respective radii that define possible torques for electric motors b and c, solving, by the control system the 3D optimization problem by modifying the radii based on a known torque for electric motor a, wherein electric motor a is associated with the engine, determining, by the control system, torque commands for the electric motors b and c and the engine based on the solving of the 3D optimization problem and the set of operating parameters and determine a torque command for electric motor a, and controlling, by the control system, the electrified powertrain based on the determined torque commands.

In some implementations, the 4D torque optimization problem is defined as follows:

$$\max(C_{OBJ}), \text{ where}$$

$$C_{OBJ} = f_{OBJ}(Ta, Tb, Tc, Ti) = k_{Ta,o}{*}Ta + k_{Tb,o}{*}Tb + k_{Tc,o}{*}Tc + k_{Ti,o}{*}Ti + D,$$

where $k_{Ta,o}$, $k_{Tb,o}$, $k_{Tc,o}$, and $k_{Ti,o}$ are known scalar coefficients and D is a known scalar constant, and where $f_{OBJ}$ represents an objective function, Ta, Tb, and Tc represent the torques of the electric motors a, b and c, respectively, and Ti represents the torque of the engine i.

In some implementations, the 4D torque optimization problem also includes two imposed non-linear minimum/maximum battery power constraints that relate electric motor torque to battery power:

PBatMin=$Pa+Pb+Pc$+DCLoad, and

PBatMax=$Pa+Pb+Pc$+DCLoad, where $Pa=(A_1*Ta+A_2)^2+C_a$, $Pb=(B_1*Tb+B_2)^2+C_b$, and $Pc=(C_1*Tc+C_2)^2+C_c$, where DCLoad represents power consumed by REEV accessories and coefficients $A_1$, $A_2$, $C_a$, $B_1$, $B_2$, $C_b$, $C_1$, $C_2$, and $C_c$ are determined empirically from electric motor loss maps.

In some implementations, the reduction of the 4D torque optimization problem comprises utilizing a known coordinate for motor torque Ta:

$Ta_{Min,n}=(Tm_{min,n}-C_n)/k_{Ta,n}$, and $Ta_{Max,n}=(Tm_{max,n}-C_n)/k_{Ta,n}$, to determine the following:

$Pa_{Min,n}=(A_1*TForPBatMin+A_2)^2+C_a$, and $Pa_{Max,n}=(A_1*TForPBatMax+A_2)^2+C_a$, where:

TForPBatmin=max(min(max($Ta_{Min,n}$,$Ta_{Max,n}$),$Ta_{Max}$), $Ta_{Min}$), and TForPBatMax=(min(max(min($Ta_{Min,n}$,$Ta_{Max,n}$), $Ta_{Min}$),$Ta_{Max}$).

In some implementations, the reduction of the 4D torque optimization problem further comprises removing motor powers $Pa_{Min,n}$ and $Pa_{Max,n}$ from the two imposed battery power constraints to obtain modified battery power constraints PBatMinMod and PBatMaxMod as follows:

$Pa_{ForPBatMax}$=min($Pa_{Min,n}$,$Pa_{Man,n}$), $Pa_{ForPBatMin}$=max($Pa_{Min,n}$,$Pa_{Max,n}$), PBatMinMod=PBatMin−$Pa_{ForPBatMin}$, and PBatMaxMod=PBatMax−$Pa_{ForPBatMax}$.

In some implementations, the modified battery power constraints represent the two concentric circles having radii RMinMod and RMaxMod defined as follows:

RMinMod=$\sqrt{[\max(0,PBatMin-Pa_{ForPBatMin}-Cb-Cc-DCLoad]}$, and

RMaxMod=$\sqrt{[\max(0,PBatMax-Pa_{ForPBatMax}-Cb-Cc-DCLoad]}$.

In some implementations, the objective function $f_{OBJ}$ nor the other constraints are a function of the known coordinate for motor torque Ta such that the modified battery power constraints would be affected. In some implementations, electric motor a is part of an MGU connected to the engine and electric motors b and c are separate electric traction motors. In some implementations, the separate electric traction motors b and c are associated with separate front and rear axles of the REEV.

According to another aspect of the invention, a torque optimization system for an electrified vehicle having an electrified powertrain including three electric motors a, b, and c and an additional torque generating system is presented. In one exemplary implementation, the torque optimization system comprises a set of sensors configured to measure a set of operating parameters of the electrified vehicle and a control system configured to determine a torque relationship between electric motors b and c as:

$Tc=M*Tb+N$, where M and N are a scalar coefficient and a scalar constant, respectively, for the torque relationship between torque Tb of electric motor b and torque Tc of electric motor c; determine values for M and N using one of a set of techniques, each technique of the set of techniques being based on a plane of combination between electric motors b and c, determine torque commands for the three electric motors a, b, and c and the torque generating system based on the determined torque relationship with the determined values for M and N and the set of operating parameters, and control the electrified powertrain based on the determined torque commands.

In some implementations, the control system is further configured to solve a 3D optimization problem for the electrified powertrain, the 3D optimization problem defining torques generatable by one of electric motors b and c, electric motor a, and the additional torque generating system, and wherein the control system is configured to determine the torque commands based on the solving of the 3D optimization problem. In some implementations, the 3D optimization problem is reduced from a 4D optimization problem for the electrified powertrain, the 4D optimization problem defining torques generatable by the three electric motors and the additional torque generating system.

In some implementations, electric motors b and c are separate electric traction motors associated with separate front and rear axles of the electrified vehicle, and wherein the set of techniques comprises a vehicle dynamics based torque split plane of combination technique where:

$M=[-RIP*Tb2To]/[-(Tc2of-RIP*Tc2To)]$, and $N=[C_{ToF}-RIP*C_{To}]/[-(Tc2Tof-RIP*Tc2To)]$, where RIP represents a ratio of front axle torque to total output torque and is defined as:

$RIP=[Tc2ToF*Tc+C_{ToF}]/[Tb2To*Tb+Tc2To*Tc+C_{To}]$, where Tc2ToF is a known contribution to the front axle torque by electric motor c, Tb2To is a known contribution to the total output torque by electric motor b, Tc2To is a known contribution to the total output torque by electric motor c, and $C_{ToF}$ and $C_{To}$ are known constant terms.

In some implementations, electric motors b and c are separate electric traction motors associated with a same axle of the electrified vehicle, and wherein the set of techniques comprises a vehicle dynamics based torque vectoring plane of combination technique where M equals 1 and N equals a difference between (i) negative one and (ii) a difference between Tb and Tc. In some implementations, the set of techniques comprises an electric motor torque equality constraint plane of combination technique where M equals zero and N equals minimum and maximum torque extremes for electric motor c.

In some implementations, the set of techniques comprises a physics-based driveline equality constraint plane of combination technique where when two of three electric motor torques are independent variables:

$M=-k_{Tb,n}/k_{Tc,n}$, and $N=(Tm_n-C_n)/K_{Tc,n}$, where $Tm_n$ is a known torque, $k_{Tb,n}$ and $k_{Tc,n}$ are known scalar coefficients, and $C_n$ is a known constant term, and where when only one of the three electric motor torques is an independent variable, M equals zero and N equals $(Tm_n - C_n)/k_{Tc,n}$.

The torque optimization system of claim 1, wherein the set of techniques comprises an optimal efficiency line plane of combination technique where:

$$M=(k_{Tz,o}/k_{Ty,o})*(B_1/C_1), \text{ and}$$

$$N=(k_{Tz,o}/k_{Ty,o})*(B_2/C_2)-(C_2/C_1),$$

where an optimal efficiency line through an origin of a Tx, Ty, Tz transformed torque plane is defined as:

$$k_{Tx,o}*Tx+k_{Ty,o}*Ty+k_{Tz,o}*Tz+k_{Ti,o}*Ti+D,$$

where $Tx=A_1*Ta+A_2$, $Ty=B_1*Ty+B_2$, and $Tz=C_1*Tc+C_2$, where $A_1$, $B_1$, and $C_1$ are known scalar coefficients and $A_2$, $B_2$, $C_2$, and D are known scalar constant terms, and where a vector of the optimal efficiency line is defined as $[k_{Tx,o}\ k_{Ty,o}\ k_{Tz,o}]$.

In some implementations, the set of techniques comprises a constrained torque limit cuboid corner fit plane of combination where:

$$M=(Tc_{Max}-Tc_{Min})/(Tb_{Max}-Tb_{Min}), \text{ and}$$

$$N=Tc_{Min}-M*Tb_{Min},$$

where coordinates $(Tb_{Min}, Tc_{Min})$ and $(Tb_{Max}, Tc_{Max})$ represent corners of a torque limit cuboid.

The torque optimization system of claim 1, wherein the set of techniques is a plurality of techniques comprising (i) a vehicle dynamics based torque split or torque vectoring plane of combination technique, (ii) an electric motor torque equality constraint plane of combination technique, (iii) a physics-based driveline equality constraint plane of combination technique, (iv) an optimal efficiency line plane of combination technique, and (v) a constrained torque limit cuboid corner fit plane of combination technique, and wherein the control system is configured to select the one of the plurality of techniques based on the set of operating parameters.

According to another aspect of the invention, a torque optimization method for an electrified vehicle having an electrified powertrain including three electric motors a, b, and c and an additional torque generating system is presented. In one exemplary implementation, the torque optimization method comprises receiving, by a control system and from a set of sensors, a set of operating parameters of the electrified vehicle, determining, by the control system, a torque relationship between electric motors b and c as:

$$Tc=M*Tb+N,$$

where M and N are a scalar coefficient and a scalar constant, respectively, for the torque relationship between torque Tb of electric motor b and torque Tc of electric motor c, determining, by the control system, values for M and N using one of a set of techniques, each technique of the set of techniques being based on a plane of combination between electric motors b and c, determining, by the control system, torque commands for the three electric motors a, b, and c and the torque generating system based on the determined torque relationship with the determined values for M and N and the set of operating parameters, and controlling, by the control system, the electrified powertrain based on the determined torque commands.

In some implementations, the method further comprises solving, by the control system, a 3D optimization problem for the electrified powertrain, the 3D optimization problem defining torques generatable by one of electric motors b and c, electric motor a, and the additional torque generating system, and wherein the control system is configured to determine the torque commands based on the solving of the 3D optimization problem. In some implementations, the 3D optimization problem is reduced from a 4D optimization problem for the electrified powertrain, the 4D optimization problem defining torques generatable by the three electric motors and the additional torque generating system.

In some implementations, electric motors b and c are separate electric traction motors associated with separate front and rear axles of the electrified vehicle, and wherein the set of techniques comprises a vehicle dynamics based torque split plane of combination technique where:

$$M=[-RIP*Tb2To]/[-(Tc2of-RIP*Tc2To)], \text{ and}$$

$$N=[C_{ToF}-RIP*C_{To}]/[-(Tc2Tof-RIP*Tc2To)],$$

where RIP represents a ratio of front axle torque to total output torque and is defined as:

$$RIP=[Tc2ToF*Tc+C_{ToF}]/[Tb2To*Tb+Tc2To*Tc+C_{To}],$$

where Tc2ToF is a known contribution to the front axle torque by electric motor c, Tb2To is a known contribution to the total output torque by electric motor b, Tc2To is a known contribution to the total output torque by electric motor c, and $C_{ToF}$ and $C_{To}$ are known constant terms.

In some implementations, electric motors b and c are separate electric traction motors associated with a same axle of the electrified vehicle, and wherein the set of techniques comprises a vehicle dynamics based torque vectoring plane of combination technique where M equals 1 and N equals a difference between (i) negative one and (ii) a difference between Tb and Tc. In some implementations, the set of techniques comprises an electric motor torque equality constraint plane of combination technique where M equals zero and N equals minimum and maximum torque extremes for electric motor c.

In some implementations, the set of techniques comprises a physics-based driveline equality constraint plane of combination technique where when two of three electric motor torques are independent variables:

$$M=-k_{Tb,n}/k_{Tc,n}, \text{ and}$$

$$N=(Tm_n-C_n)/K_{Tc,n},$$

where $Tm_n$ is a known torque, $k_{Tb,n}$ and $k_{Tc,n}$ are known scalar coefficients, and $C_n$ is a known constant term, and where when only one of the three electric motor torques is an independent variable, M equals zero and N equals $(Tm_n - C_n)/k_{Tc,n}$.

In some implementations, the set of techniques comprises an optimal efficiency line plane of combination technique where:

$$M=(k_{Tz,o}/k_{Ty,o})*(B_1/C_1), \text{ and}$$

$$N=(k_{Tz,o}/k_{Ty,o})*(B_2/C_2)-(C_2/C_1),$$

where an optimal efficiency line through an origin of a Tx, Ty, Tz transformed torque plane is defined as:

$$k_{Tx,o}*Tx+k_{Ty,o}*Ty+k_{Tz,o}*Tz+k_{Ti,o}*Ti+D,$$

where $Tx=A_1*Ta+A_2$, $Ty=B_1*Ty+B_2$, and $Tz=C_1*Tc+C_2$, where $A_1$, $B_1$, and $C_1$ are known scalar coefficients and $A_2$, $B_2$, $C_2$, and D are known scalar constant terms, and where a vector of the optimal efficiency line is defined as $[k_{Tx,o}\ k_{Ty,o}\ k_{Tz,o}]$.

In some implementations, the set of techniques comprises a constrained torque limit cuboid corner fit plane of combination where:

$$M=(Tc_{Max}-Tc_{Min})/(Tb_{Max}-Tb_{Min}), \text{ and}$$

$$N=Tc_{Min}-M*Tb_{Min},$$

where coordinates $(Tb_{Min}, Tc_{Min})$ and $(Tb_{Max}, Tc_{Max})$ represent corners of a torque limit cuboid.

In some implementations the set of techniques is a plurality of techniques comprising (i) a vehicle dynamics based torque split or torque vectoring plane of combination technique, (ii) an electric motor torque equality constraint plane of combination technique, (iii) a physics-based driveline equality constraint plane of combination technique, (iv) an optimal efficiency line plane of combination technique, and (v) a constrained torque limit cuboid corner fit plane of combination technique, and wherein the control system is configured to select the one of the plurality of techniques based on the set of operating parameters.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, torque optimization in an electrified vehicle having four torque sources creates a four-dimensional (4D) optimization problem that is much more difficult and computationally-intensive to solve than a three-dimensional (3D) or less optimization problem. Conventional dimension reduction solutions are offline, predetermined solutions that have fixed parameters that do not perform as well as a newly-proposed online solution. In addition, there are not currently any dimension reduction solutions for electrified powertrains having four (4) different torque generating sources or systems. Accordingly, physics-based dimension reduction strategies for online torque optimization in electrified vehicles are presented herein. The techniques of the present application reduce the 4D optimization problem to a 3D optimization problem by determining a correlation between two of the electric motors of an electrified vehicle having three or more electric motors. The electrified vehicle could be, for example, a range-extended electrified vehicle (REEV) having an internal combustion engine, a motor-generator unit (MGU) and two electric traction motors (e.g., one per front and rear axle of the electrified vehicle) or an electrified vehicle having four electric traction motors (e.g., one per wheel), A first aspect of the invention is the physics-based reduction of the 4D optimization problem into a 3D optimization problem, which is then solvable online by an embedded processor of a vehicle, which involves strategically selecting values for M and N in the following 3D optimization equation:

$$Tb=M*Ta+N \tag{1},$$

where Ta and Tb represent torques of motors a and b of an electrified powertrain. Second and third aspects of the invention are the various ways that we can strategically select the values for M and N. There are six (6) different solutions presented herein, and each of the different solutions could be utilized at various times during vehicle operation depending on operating conditions. These six different solutions or dimension reduction strategies are generally dividable into (i) a radii modification based dimension reduction strategy (the second aspect of the invention) and (ii) five (5) different optimization plane based dimension reduction strategies (the third aspect of the invention). Potential benefits of the techniques of the present application included reduced computational costs (e.g., reduced hardware costs) and improved vehicle torque optimization and, as a result, vehicle efficiency and drivability.

Figure 1A:
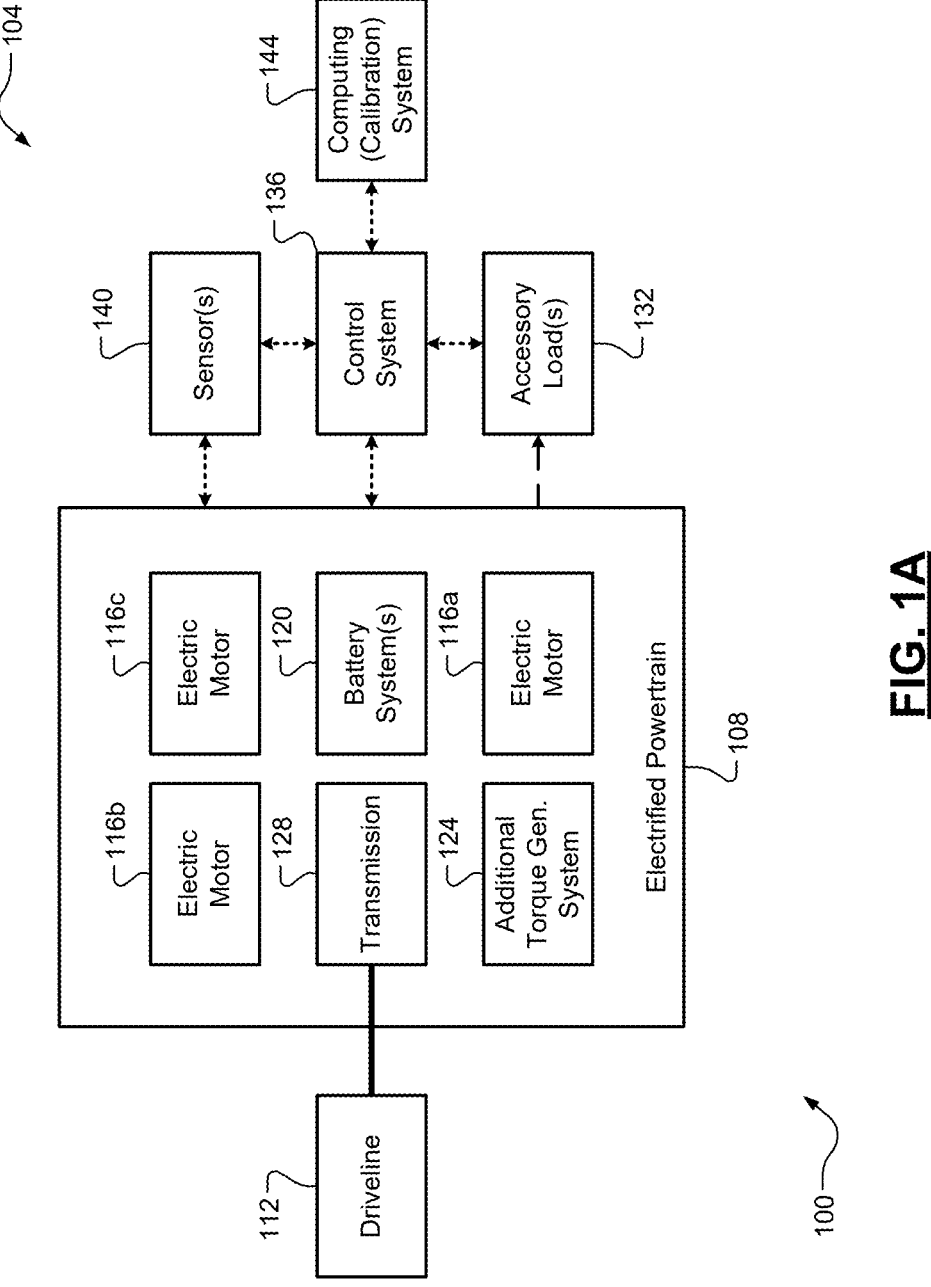
FIGS. 1A-1B are functional block diagrams of two configurations of an electrified vehicle having an example torque optimization system according to the principles of the present application.
Figure 1B:
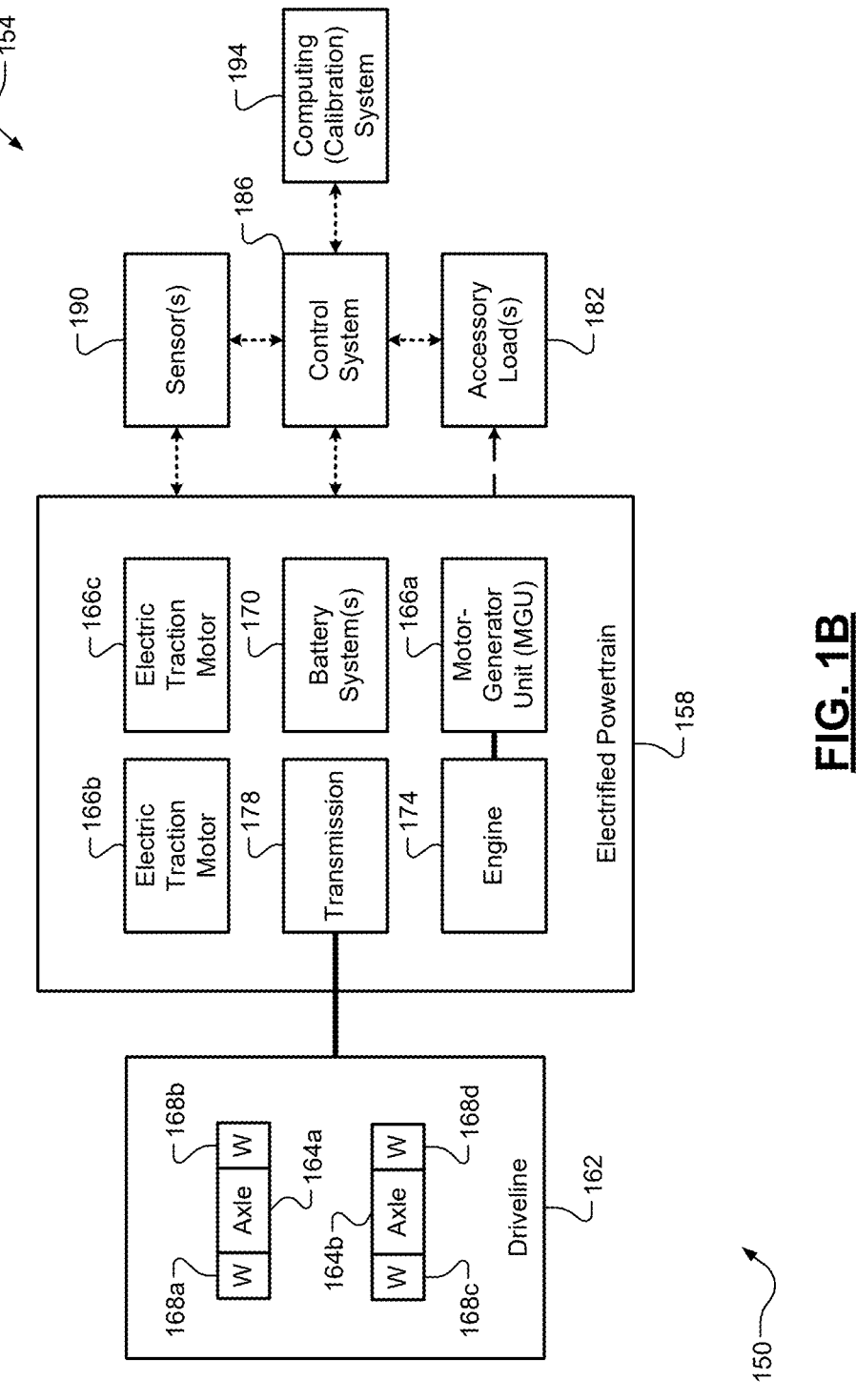

Referring now to FIGS. 1A-1B, functional block diagrams of two example configurations of an electrified vehicle 100, 150 each having an example torque optimization system 104, 154 according to the principles of the present application are illustrated. In FIG. 1A, the electrified vehicle 100 includes an electrified powertrain 108 configured to generate and transfer torque to a driveline 112 for propulsion. The electrified powertrain 108 includes at least three electric motors 116a, 116b, and 116c (collectively, "electric motors 116") powered by one or more battery systems 120. The electrified powertrain 108 also includes an additional torque generating source or system 124, which could be an internal combustion engine or another electric motor. Torque generated by these devices 116, 124 is selectively transferred to the driveline 112 via a transmission 128, such as a multi-speed step-gear automatic transmission. At least some of the torque generated by the devices 116, 124 could also be converted into electrical energy (current) such as to recharge the battery system(s) 120 and/or to power a set of accessory loads 132 of the electrified vehicle 100. A controller or control system 136 is configured to control the electrified vehicle 100, including controlling the electrified powertrain 108 to generate and transfer a desired amount of drive torque to the driveline 112 to satisfy a driver torque request, which could be received via an accelerator pedal of a set of sensors 140. The sensor(s) 140 could also be configured to measure other operating parameters of the electrified vehicle 100, including, but not limited to, speeds, torques, temperatures, and pressures.

In FIG. 11B, a more specific second configuration 150 of the electrified vehicle (also "electrified vehicle 150") is illustrated. This electrified vehicle 100 is an REEV having separate electric traction motors on separate driveline axles and an engine with a motor-generator unit (MGU) for battery system recharging. More specifically, an electrified powertrain 158 includes three electric motors 166a, 166b, and 166c (collectively, "electric motors 166") powered by one or more battery systems 170 and an internal combustion engine 174. The first electric motor 166a is or is part of an MGU that is mechanically connectable to the engine 174 (e.g., to its flywheel/crankshaft). The second and third electric motors 166b and 166c are electric traction motors associated with first (e.g., front) and second (e.g., rear) axles 164a and 164b of a driveline 162 having respective front wheels 168a, 168b and rear wheels 168c, 168d (collectively, "wheels 168"). A transmission 178 (e.g., a multi-speed step-gear automatic transmission) is configured to transfer the torque from the electrified powertrain 154 to the driveline 162 and, more specifically, to the two axles 164a, 164b (e.g., via a differential or other suitable driveline components). Similar to the first configuration of the electrified vehicle 100 in FIG. 1A, the electrified vehicle 150 also includes a set of accessory loads 182, a controller or control system 186, and a set of sensors 190 (e.g., including an accelerator pedal). The control systems 136, 186 are also configured to perform at least a portion of the techniques of the present application, although it will be appreciated that at least some operations could be performed offline by a separate computing system 144, 194 (e.g., a calibration system).

The control system 136, 186 (hereinafter, "control system 186") could include a plurality of separate electronic control units (ECUs). For example, the control system 186 could include a supervisory controller, such as an electrified vehicle control unit (EVCU) or a hybrid control processor (HCP) as well as sub-controllers such as an engine control module (ECM) and a transmission control module (TCM). The control system 186 is configured to execute a set of instructions stored on a non-transitory computer-readable memory (i.e., software) to perform at least a portion of the torque optimization and dimension reduction strategies of the present application. For the majority of the description herein, the electrified powertrain is described as being the electrified powertrain 158 shown in FIG. 1B, which includes three electric motors 166, with one electric motor 166a (an MGU) being associated with the engine 174 and the other two electric motors 166b, 166c being electric traction motors configured to drive the driveline 162 or its specific components (e.g., front/rear axles 164a, 164b). The torques of each of these four actuators are considered to be independent variables when describing the electrified powertrain 158 and are represented by variables Ta (torque of electric motor 166a), Tb (torque of electric motor 166b), Tc (torque of electric motor 166c), and Ti (torque of engine 174).

For torque optimization in such an electrified powertrain, a generic linear objective function subject to linear electric motor minimum/maximum constraints, non-linear minimum/maximum battery power constraints, and up to five (5) linear physics-based driveline minimum/maximum constraints must be minimized and maximized. This gives rise to a 4D non-linear optimization problem, where the generic linear objective function is as follows:

$$f_{OBJ}(Ta,Tb,Tc,Ti)=C_{OBJ}=k_{Ta,o}{*}Ta+k_{Tb,o}{*}Tb+k_{Tc,o}{*}Tc+k_{Ti,o}{*}Ti+D \qquad (2),$$

where $k_{Ta,o}$, $k_{Tb,o}$, $k_{Tc,o}$, and $k_{Ti,o}$ are known scalar coefficients and D is a known scalar constant, and where $f_{OBJ}$ represents the objective function to be optimized. As stated above, up to five physics-based linear minimum/maximum inequality or equality constraints are imposed and are generally described below, where n=1, . . . , 5 with constraint 1 having a greatest/highest priority and constraint 5 having a least/lowest priority:

$$Tm_{min,n}{\leq}k_{Ta,n}{*}Ta+k_{Tb,n}{*}Tb+k_{Tc,n}{*}Tc+k_{Ti,n}{*}Ti+C_n{\leq}Tm_{max,n} \qquad (3),$$

where the scalar coefficients $k_{Ta,o}$, $k_{Tb,o}$, $k_{Tc,o}$, and $k_{Ti,o}$ and the scalar constant term $C_n$ are known and $Tm_{min,n}$ and $Tm_{max,n}$ are known minimum/maximum values for the nth constraint (to impose an equality constraint, $Tm_{min,n}{=}Tm_{max,n}$). Additionally, the nth minimum inequality constraint plane is parallel to the nth maximum inequality constraint plane and the minimum/maximum constraints are imposed together as minimum/maximum sets.

For a given electrified powertrain operating mode, all five minimum/maximum constraint sets are not necessarily imposed. Three minimum/maximum inequality motor torque constraint sets, in addition to one set of minimum/maximum inequality engine torque constraints, are also imposed. These constraints become equality constraints if the minimum motor torque constraint is equal to the maximum motor torque constraint:

$$Ta_{Min}{\leq}Ta{\leq}Ta_{Max} \qquad (4),$$

$$Tb_{min}{\leq}Tb{\leq}Tb_{max} \qquad (5),$$

$$Tc_{min}{\leq}Tc{\leq}Tc_{max} \qquad (6), and$$

$$Ti_{min}{\leq}Ti{\leq}Ti_{max} \qquad (7).$$

Finally, two non-linear minimum/maximum battery power constraints are also imposed as shown below relating electric motor torque to battery power:

$$PBatMin=Pa+Pb+Pc+DCLoad \qquad (8), and$$

$$PBatMax=Pa+Pb+Pc+DCLoad \qquad (9), where$$

$$Pa=(A_1{*}Ta+A_2)^2+C_a \qquad (10),$$

$$Pb=(B_1{*}Tb+B_2)^2+C_b \qquad (11), and$$

$$Pc=(C_1{*}Tc+C_2)^2+C_c \qquad (12),$$

where DCLoad represents power consumed by the accessory loads 182 (heater, air conditioner, radio, etc.) and coefficients $A_1$, $A_2$, $C_a$, $B_1$, $B_2$, $C_b$, $C_1$, $C_2$, and $C_c$ are determined empirically from electric motor loss maps.

Figure 3A:
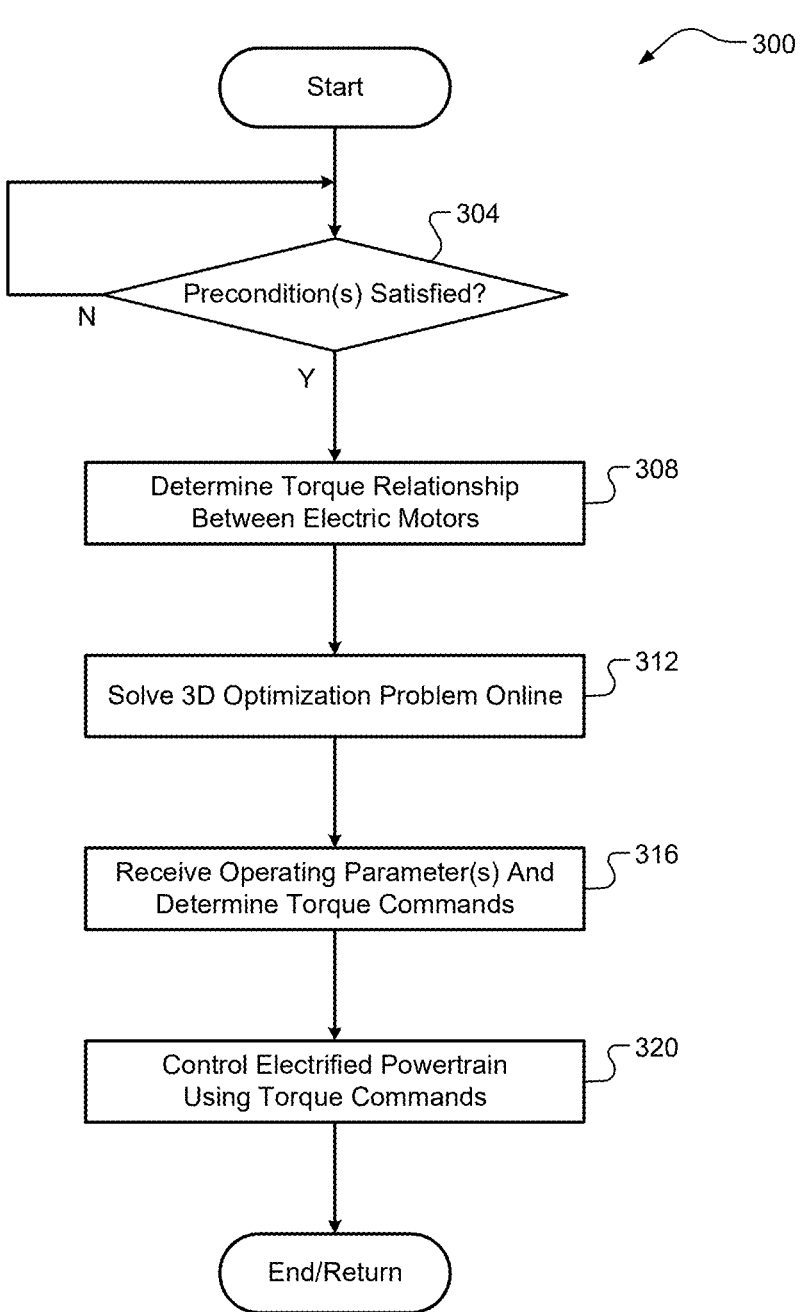
FIGS. 3A-3C and 4 are flow diagrams of example torque optimization and dimension reduction methods for an electrified vehicle according to the principles of the present application.

Referring now to FIG. 3A and with continued reference to FIGS. 1A-1B, a flow diagram of a first example torque optimization and dimension reduction method 300 for an electrified vehicle according to the principles of the present application is illustrated. While the method 300 specifically references the electrified vehicle 150 (or electrified vehicle 100) and the corresponding components, it will be appreciated that the method 300 could be applicable to any suitably configured electrified vehicles. The method 300 begins at 304. At 304, the control system 186 determines whether a set of one or more optional preconditions have been satisfied. These precondition(s) could include, for example, the electrified vehicle 150 being powered up and running and there being no malfunctions or faults present that would negatively impact or otherwise inhibit the operation of the techniques of the present application. When false, the method 300 ends or returns to 304. When true, the method 300 proceeds to 308. At 308, the control system 186 determines the torque relationship between electric motors 166b and 166c (e.g., Tc=M*Tb+N) as discussed herein. At 312, the control system 186 solves the 3D optimization problem for the electrified powertrain 158 (e.g., Ta, Tb, and Ti). At 316, the control system 186 determines torque commands for the three electric motors 166 and the additional torque generating system 124 (e.g., engine 174) based a set of operating parameters (e.g., from sensor(s) 190) and based further on the solving of the 3D optimization problem (to determine Ta, Tb, and Ti) and the determined torque relationship (to determine Tc). At 320, the control system 186 control the electrified powertrain 158 based on the determined torque commands. The method 300 then ends or returns to 304 or 308.

Figure 2:
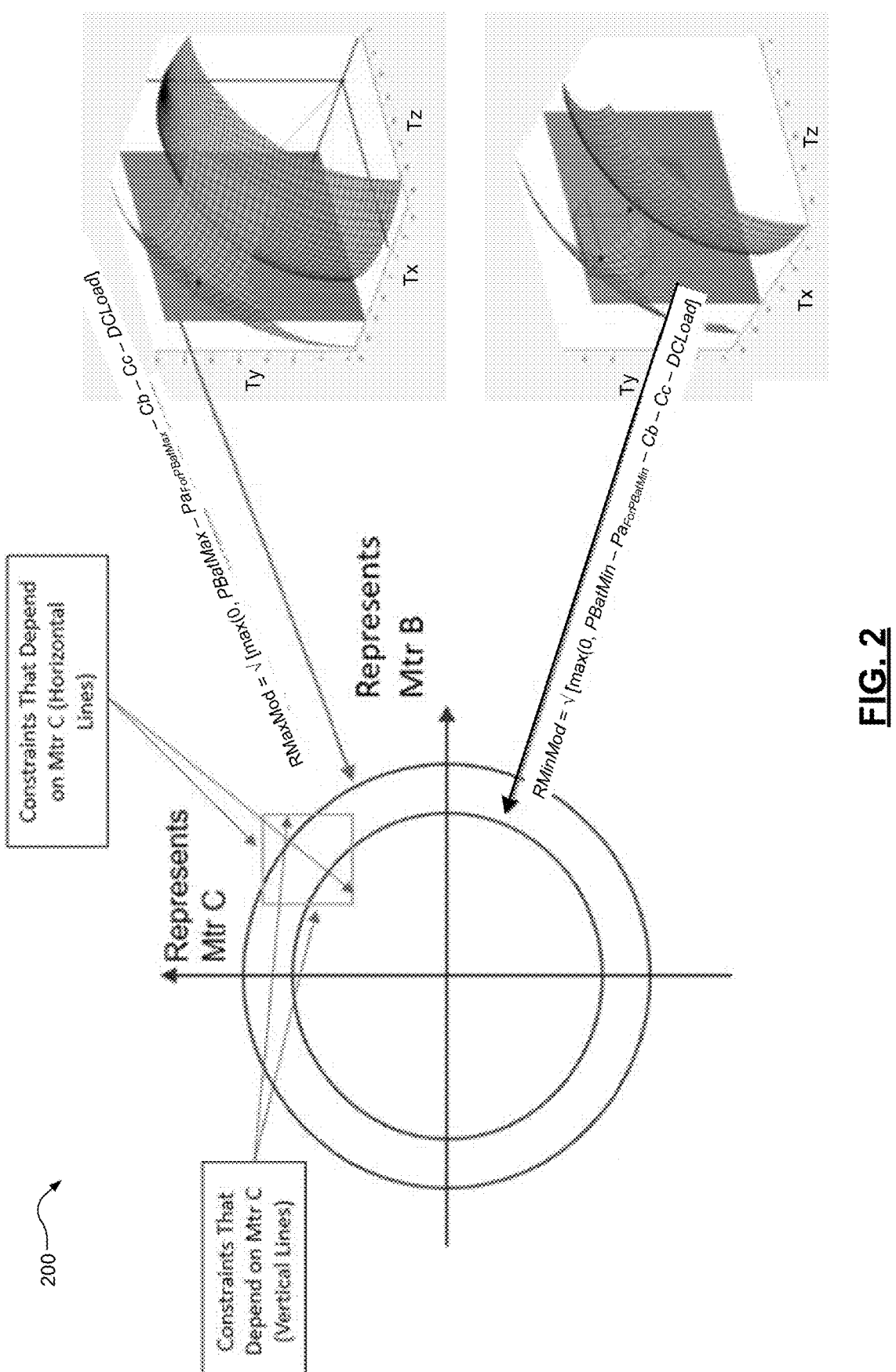
FIG. 2 is a diagram illustrating an example radii modification based dimension reduction strategy according to the principles of the present application.

Referring again to FIGS. 1A-1B and also to FIG. 2, in a transformed domain (defined by leveraging the coefficients described above), the battery power constraints are represented by two concentric spheres as shown in the diagram 200 of FIG. 2 and having minimum and maximum radii as follows:

$$RMinMod=[max(0,PBatMin-Pa_{ForPBatMin}-Cb-Cc-\\ DCLoad] \quad (13), and$$

$$RMaxMod=[max(0,PBatMax-Pa_{ForPBatMax}-Cb-Cc-\\ DCLoad] \quad (14).$$

As the previously-described 4D optimization problem must be solved online in an embedded processor, conserving processor resources without compromising accuracy is of the utmost importance. In certain situations, it is known that the object function minimum and maximum values lie along a certain physics-based driveline linear minimum/maximum inequality constraint (as described above). Consider the scenario below where objective function and constraints are described as follows:

$$f_{OBJ}(Tb,Tc)=C_{OBJ}=k_{Tb,o}*Tb+k_{Tc,o}*Tc+D \quad (15), and$$

$$Tm_{min,n} \leq k_{Ta,n}*Ta+C_n \leq Tm_{max,n} \quad (16).$$

In such situations, one of the four coordinates of the objective function minimum/maximum points is known. In the situation described above, the Ta coordinates are known as described below:

$$Ta_{Min,n}=(Tm_{min,n}-C_n)/k_{Ta,n} \quad (17), and$$

$$Ta_{Max,n}=(Tm_{max,n}-C_n)/k_{Ta,n} \quad (18),$$

$$TForPBatmin=max(min(max(Ta_{Min,n},Ta_{Max,n}),Ta_{Max}),\\ Ta_{Min}) \quad (19), and$$

$$TForPBatMax=(min(max(min(Ta_{Min,n},Ta_{Max,n}),\\ Ta_{Min}),Ta_{Max}) \quad (20),$$

where $Ta_{Min}$ and $Ta_{Max}$ are minimum and maximum torque constraints of the MGU or electric motor 166c. Using TForPBatMin and TForPBatMax described above, two powers for electric motor 166a can also be calculated and are described as follows:

$$Pa_{Min,n}=(A_1*TForPBatMin+A_2)^2+C_a \quad (21), and$$

$$Pa_{Max,n}=(A_1*TForPBatMax+A_2)^2+C_a, \quad (22).$$

Finally, the motor powers described in Equations 21-22 above can be used to reduce the 4D optimization problem to a 3D optimization problem by removing them from the battery power constraints PBatMinMod and PBatMaxMod as shown below:

$$Pa_{ForPBatMax}=min(Pa_{Min,n},Pa_{Man,n}) \quad (23),$$

$$Pa_{ForPBatMin}=max(Pa_{Min,n},Pa_{Max,n}) \quad (24),$$

$$PBatMinMod=PBatMin-Pa_{ForPBatMin} \quad (25), and$$

$$PBatMaxMod=PBatMax-Pa_{ForPBatMax} \quad (26).$$

The modified battery powers described above can be used in place of the battery power constraints to formulate a 3D optimization problem with decision variables Tb, Tc, and Ti. In the reduced 3D optimization problem, the modified battery power constraints are represented by the two concentric circles as shown in the diagram 200 of FIG. 2.

Figure 3B:
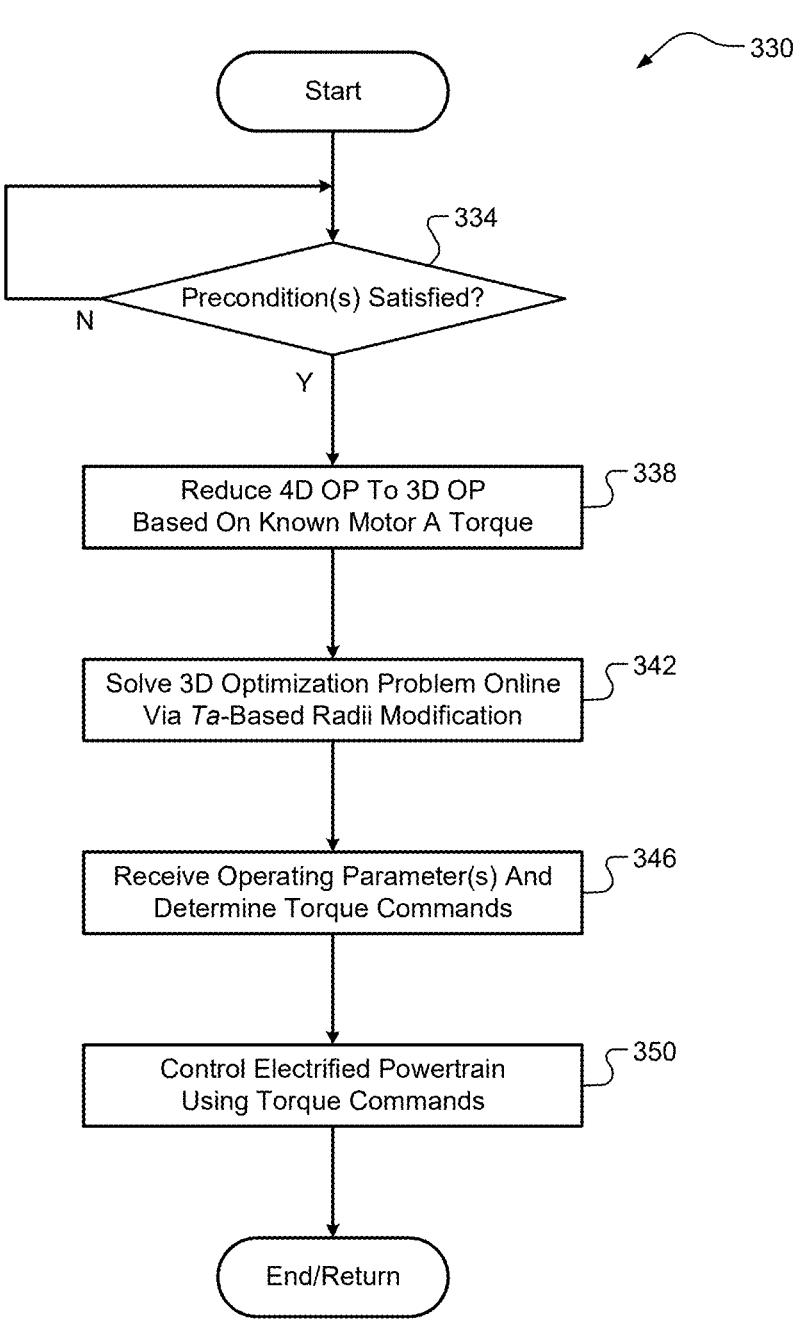

Referring now to FIG. 3B, a flow diagram of a second example torque optimization and dimension reduction method 330 for an electrified vehicle according to the principles of the present application is illustrated. While the method 330 specifically references the electrified vehicle 150 (or electrified vehicle 100) and the corresponding components, it will be appreciated that the method 330 could be applicable to any suitably configured electrified vehicles. The method 330 begins at 334. At 334, the control system 186 determines whether a set of one or more optional preconditions have been satisfied. These precondition(s) could include, for example, the electrified vehicle 150 being powered up and running and there being no malfunctions or faults present that would negatively impact or otherwise inhibit the operation of the techniques of the present application. When false, the method 330 ends or returns to 334. When true, the method 330 proceeds to 338. At 338, the control system 186 reduces the 4D optimization problem (OP) for torques of the electrified powertrain 158 to a 3D optimization problem (OP) as described above and as shown in FIG. 2. At 342, the control system 186 solves the 3D optimization problem for the electrified powertrain 158 (e.g., Tb, Tc, and Ti) via the radii modification strategy (based on known Ta) as described above and as shown in FIG. 2. At 346, the control system 186 determines torque commands for the three electric motors 166 and the additional torque generating system 124 (e.g., engine 174) based a set of operating parameters (e.g., from sensor(s) 190) and based further on the solving of the 3D optimization problem (to determine Tb, Tc, and Ti) and the known Ta (e.g., via a known torque relationship). At 350, the control system 186 controls the electrified powertrain 158 based on the determined torque commands. The method 330 then ends or returns to 334 or 338.

For the reduced determined torque relationship (Equation 1) between electric motor 166b and electric motor 166c, which is reproduced for reference below, there are also other strategies or techniques for determining the values for scalar coefficient M and scalar constant term N. One such technique is known as a plane optimization technique, for which there are a plurality of different variations described herein and below. One or multiple different plane optimization techniques could be utilized, and in some cases, each of these different plane optimization techniques could be used at a different time during operation of the electrified vehicle 150 depending on the particular operating conditions.

$$Tb=M*Ta+N \quad (1).$$

In other words, there is a set of plane of combination based techniques, which could include a plurality of difference techniques. In the present application, five (5) different specific plane of combination based techniques are disclosed. The control system 186 could select one of the plurality of different techniques, for example, based on the set of operating parameters (e.g., measured by sensors 190) indicative of operating conditions of the electrified vehicle 150.

A first technique (Technique 1) is a vehicle dynamics based torque split plane of combination technique. In this technique, electric motors b and c (e.g., electric motors 166b and 166c) are separate electric traction motors associated with separate front and rear axles (e.g., axles 164a, 164b) of the electrified vehicle 150 and the values of variables M and N are determined as follows:

$$M=[-RIP*Tb2To]/[-(Tc2of-RIP*Tc2To)] \qquad (27), and$$

$$N=[C_{ToF}-RIP*C_{To}]/[-(Tc2Tof-RIP*Tc2To)] \qquad (28),$$

where RIP represents a ratio of front axle torque to total output torque and is defined as:

$$RIP=[Tc2ToF*Tc+C_{ToF}]/[Tb2To*Tb+Tc2To*Tc+C_{To}] \qquad (29),$$

where Tc2ToF is a known contribution to the front axle torque by electric motor c, Tb2To is a known contribution to the total output torque by electric motor b, Tc2To is a known contribution to the total output torque by electric motor c, and $C_{ToF}$ and $C_{To}$ are known constant terms. In an alternate version of this same type of technique, referred to herein as a vehicle dynamics based torque vectoring plane of combination technique, electric motors b and c (e.g., electric motors 166b and 166c) are separate electric traction motors associated with a same axle (e.g., 164a or 164b) of the electrified vehicle 150. In this example, M equals 1 and N equals a difference between (i) negative one and (ii) a difference between Tb and Tc (i.e., N=−1−[Tb−Tc]).

A second technique (Technique 2) is an electric motor torque equality constraint plane of combination technique. In this technique, M equals zero and N equals minimum and maximum torque extremes for electric motor c (i.e., $Tc_{Min}=Tc_{Max}=Tc_{Equality}$, where $Tc_{Equality}$ is typically zero). A third technique (Technique 3) is a physics-based driveline equality constraint plane of combination technique where when two of three electric motor torques are independent variables:

$$M=-k_{Tb,n}/k_{Tc,n} \qquad (30), and$$

$$N=(Tm_n-C_n)/K_{Tc,n} \qquad (31),$$

where $Tm_n$ is a known torque, $k_{Tb,n}$ and $k_{Tc,n}$ are known scalar coefficients, and $C_n$ is a known constant term, and where when only one of the three electric motor torques is an independent variable, M equals zero and N equals $(Tm_n-C_n)/k_{Tc,n}$.

A fourth technique (Technique 4) is an optimal efficiency line plane of combination technique where:

$$M=(k_{Tz,o}/k_{Ty,o})*(B_1/C_1) \qquad (32), and$$

$$N=(k_{Tz,o}/k_{Ty,o})*(B_2/C_2)-(C_2/C_1) \qquad (33),$$

where an optimal efficiency line through an origin of a Tx, Ty, Tz transformed torque plane is defined as:

$$k_{Tx,o}*Tx+k_{Ty,o}*Ty+k_{Tz,o}*Tz+k_{Ti,o}*Ti+D \qquad (34),$$

where $Tx=A_1*Ta+A_2$, $Ty=B_1*Ty+B_2$, and $Tz=C_1*Tc+C_2$, where $A_1$, $B_1$, and $C_1$ are known scalar coefficients and $A_2$, $B_2$, $C_2$, and D are known scalar constant terms, and where a vector of the optimal efficiency line is defined as $[k_{Tx,o} \ k_{Ty,o} \ k_{Tz,o}]$. Lastly, a fifth technique (Technique 5) is a constrained torque limit cuboid corner fit plane of combination where:

$$M=(Tc_{Max}-Tc_{Min})/(Tb_{max}-Tb_{Min}) \qquad (35), and$$

$$N=Tc_{Min}-M*Tb_{Min} \qquad (36),$$

where coordinates $(Tb_{Min}, Tc_{Min})$ and $(Tb_{Max}, Tc_{Max})$ represent corners of a torque limit cuboid.

In one exemplary implementation, the set of techniques is a plurality of techniques comprising (i) a vehicle dynamics based torque split or torque vectoring plane of combination technique, (ii) an electric motor torque equality constraint plane of combination technique, (iii) a physics-based driveline equality constraint plane of combination technique, (iv) an optimal efficiency line plane of combination technique, and (v) a constrained torque limit cuboid corner fit plane of combination technique, and wherein the control system is configured to select the one of the plurality of techniques based on the set of operating parameters.

Figure 3C:
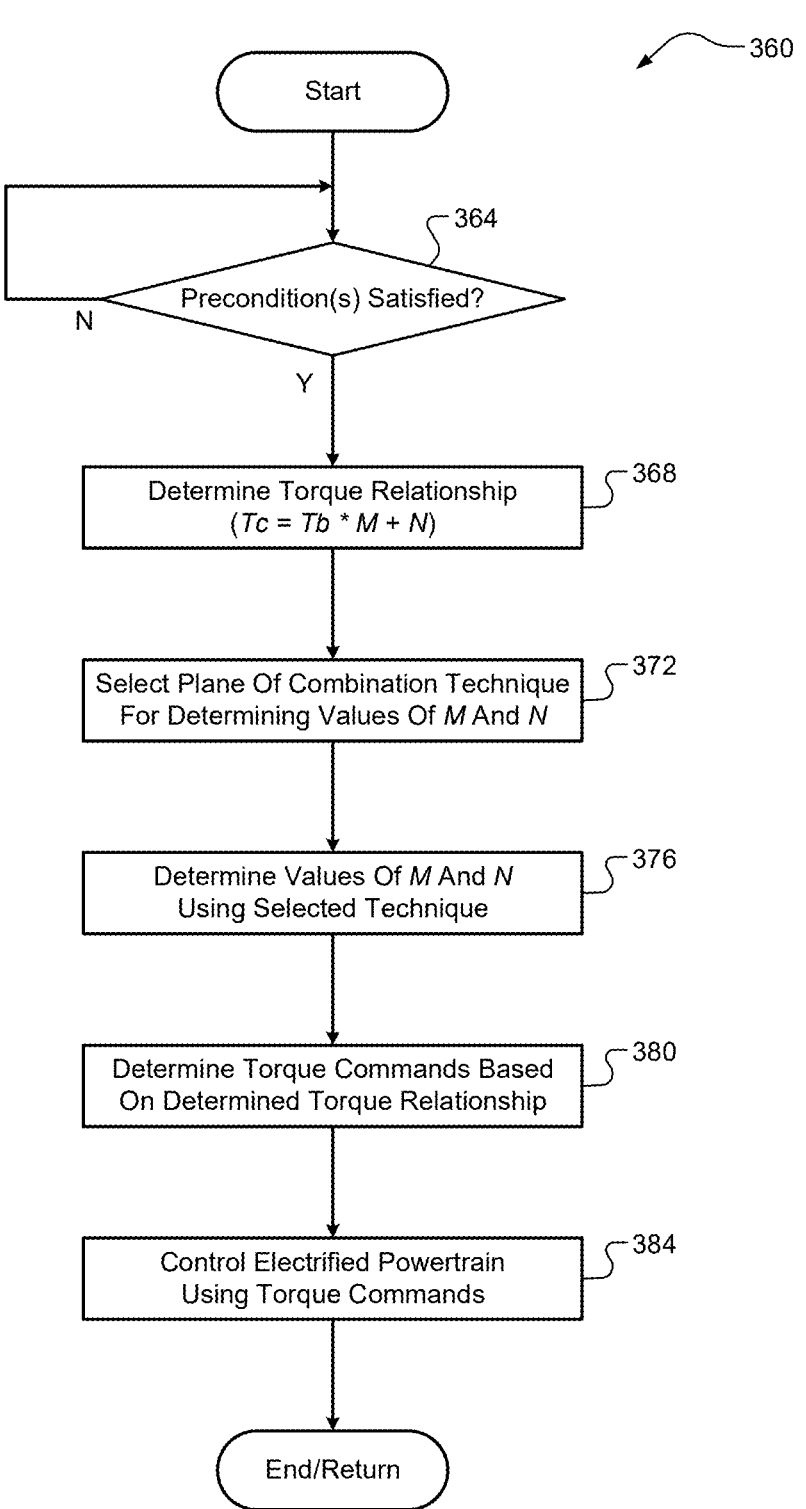
Figure 4:
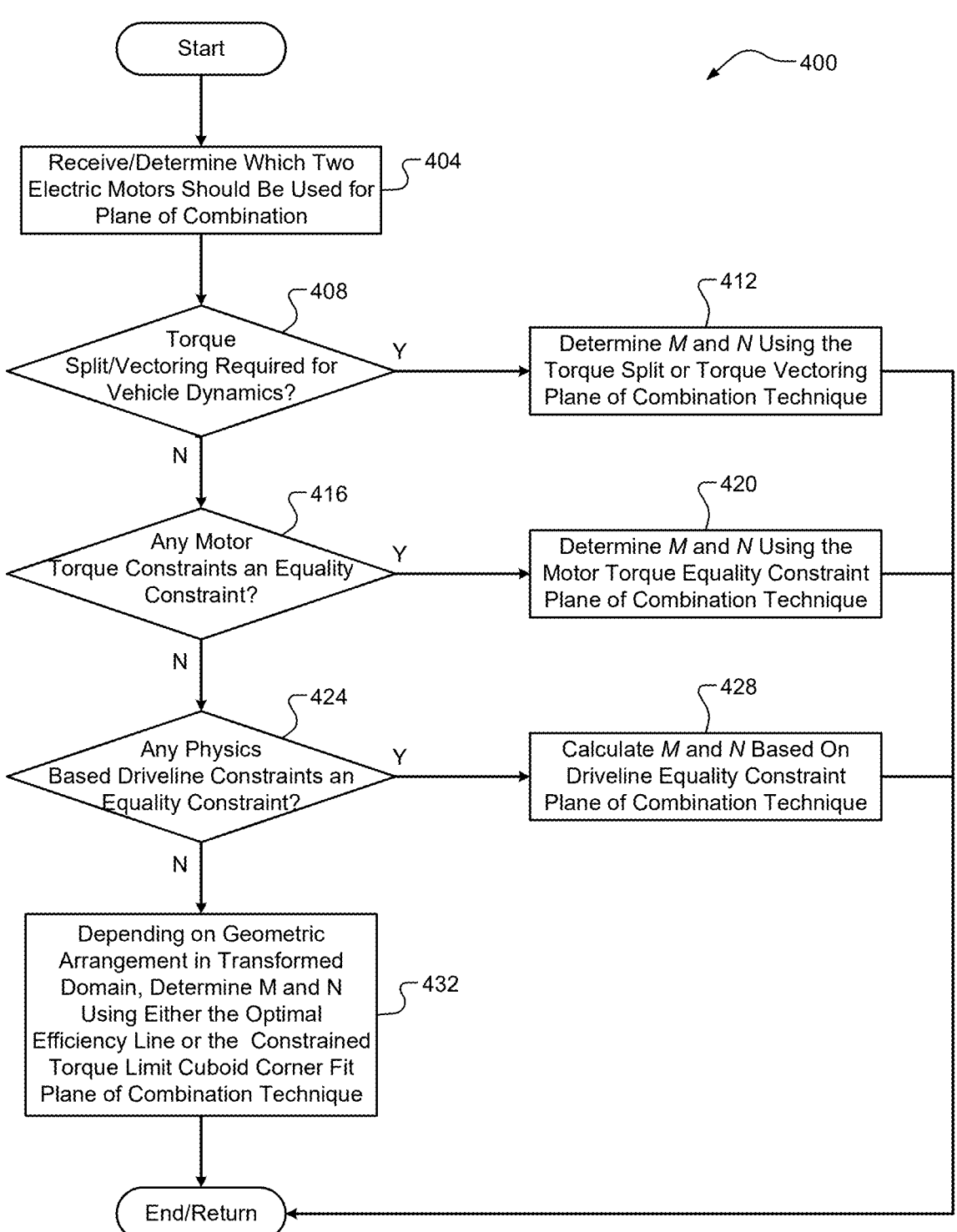

Referring now to FIG. 3C, a flow diagram of a third example torque optimization and dimension reduction method 360 for an electrified vehicle according to the principles of the present application is illustrated. While the method 360 specifically references the electrified vehicle 150 (or electrified vehicle 100) and the corresponding components, it will be appreciated that the method 360 could be applicable to any suitably configured electrified vehicles. The method 360 begins at 364. At 364, the control system 186 determines whether a set of one or more optional preconditions have been satisfied. These precondition(s) could include, for example, the electrified vehicle 150 being powered up and running and there being no malfunctions or faults present that would negatively impact or otherwise inhibit the operation of the techniques of the present application. When false, the method 360 ends or returns to 364. When true, the method 360 proceeds to 368. At 368, the control system 186 determines a torque relationship between electric motors 166b and 166c (e.g., Tc=M*Tb+N). At 372, the control system 186 selects a technique (e.g., a specific plane of combination technique of the plurality of plane of combination techniques) for determining the values for M and N. This selection process could be performed by the control system 186 based on current operating conditions of the electrified vehicle 150. FIG. 4, for example, illustrates a flow diagram of one example selection process for the plane of combination technique. At 376, the control system 186 determines the values for M and N using the selected technique. At 380, the control system 186 determines torque commands for the three electric motors 166 and the additional torque generating system 124 (e.g., engine 174) based a set of operating parameters (e.g., from sensor(s) 190) and based further on the torque relationship with determined values for M and N. At 384, the control system 186 controls the electrified powertrain 158 based on the determined torque commands. The method 360 then ends or returns to 364 or 368.

In the example plane or combination technique selection method 400 of FIG. 4, the method 400 begins at 404 where the control system 186 receives or determines which two electric motors (e.g., electric motors 166b and 166c) should be used for the plane of combination. The method 400 then proceeds to 408 where the decision and technique selection process occurs. At 408, the control system 186 determines whether torque split/vectoring is required for vehicle dynamics. When true, the method 400 proceeds to 412. When false, the method 400 proceeds to 416. At 412, the control system 186 selects the torque split or torque vectoring plane of combination technique and the method 400 ends or returns to 370 of FIG. 3C where it is then utilized to determine the values for M and N. At 416, the control system 186 determines whether any of the three electric motor torque constraints is an equality constraint. When true, the method 400 proceeds to 420. When false, the method 400 proceeds to 424. At 420, the control system 186 selects the motor torque equality constraint plane of combination technique and the method 400 ends or returns to 370 of FIG. 3C where it is then utilized to determine the values for M and N. At 424, the control system 186 determines whether any physics-based driveline constraints are an equality constraint. When true, the method 400 proceeds to 428. When false, the method 400 proceeds to 432. At 428, the control system 186 selects the driveline equality constraint plane of combination technique and the method 400 ends or returns to 370 of FIG. 3C where it is then utilized to determine the values for M and N. At 432, the control system 186, based or depending on a geometric arrangement in the transformed domain as previously discussed herein, selects either the optimal efficiency line plane of combination technique or the constrained torque limit cuboid corner fit plane of combination technique. The method 400 then ends or returns to 370 of FIG. 3C where it is then utilized to determine the values for M and N.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A torque optimization system for a range-extended electrified vehicle (REEV) having an electrified powertrain including an internal combustion engine and three electric motors a, b, and c, the torque optimization system comprising:

a set of sensors configured to measure a set of operating parameters of the REEV; and a control system configured to:

reduce a four-dimensional (4D) optimization problem for the electrified powertrain to a three-dimensional (3D) optimization problem, the 4D optimization problem defining torques generatable by the three electric motors a, b, and c and engine, wherein the reducing comprises determining modified battery power constraints representing two concentric circles having respective radii that define possible torques for electric motors b and c;

solve the 3D optimization problem by modifying the radii based on a known torque for electric motor a, wherein electric motor a is associated with the engine;

determine torque commands for the electric motors b and c and the engine based on the solving of the 3D optimization problem and the set of operating parameters and determine a torque command for electric motor a; and control the electrified powertrain based on the determined torque commands.

2. The torque optimization system of claim 1, wherein the 4D torque optimization problem is defined as follows:

$$\max(C_{OBJ}), \text{ where}$$

$$C_{OBJ}=f_{OBJ}(Ta,Tb,Tc,Ti)=k_{Ta,o}*Ta+k_{Tb,o}*Tb+k_{Tc,o}*Tc+k_{Ti,o}*Ti+D,$$

where $k_{Ta,o}$, $k_{Tb,o}$, $k_{Tc,o}$, and $k_{Ti,o}$ are known scalar coefficients and D is a known scalar constant, and where $f_{OBJ}$ represents an objective function, Ta, Tb, and Tc represent the torques of the electric motors a, b and c, respectively, and Ti represents the torque of the engine i.

3. The torque optimization system of claim 2, wherein the 4D torque optimization problem also includes two imposed non-linear minimum/maximum battery power constraints that relate electric motor torque to battery power:

$$PBatMin=Pa+Pb+Pc+DCLoad, \text{ and}$$

$$PBatMax=Pa+Pb+Pc+DCLoad, \text{ where}$$

$$Pa=(A_1*Ta+A_2)^2+C_a,$$

$$Pb=(B_1*Tb+B_2)^2+C_b, \text{ and}$$

$$Pc=(C_1*Tc+C_2)^2+C_c,$$

where DCLoad represents power consumed by REEV accessories and coefficients $A_1$, $A_2$, $C_a$, $B_1$, $B_2$, $C_b$, $C_1$, $C_2$, and $C_c$ are determined empirically from electric motor loss maps.

4. The torque optimization system of claim 3, wherein the reduction of the 4D torque optimization problem comprises utilizing a known coordinate for motor torque Ta:

$$Ta_{Min,n}=(Tm_{min,n}-C_n)/k_{Ta,n}, \text{ and}$$

$$Ta_{Max,n}=(Tm_{max,n}-C_n)/k_{Ta,n},$$

to determine the following:

$$Pa_{Min,n}=(A_1*TForPBatMin+A_2)^2+C_a, \text{ and}$$

$$Pa_{Max,n}=(A_1*TForPBatMax+A_2)^2+C_a,$$

where:

$$TForPBatmin=\max(\min(\max(Ta_{Min,n},Ta_{max,n}),Ta_{Max}),Ta_{Min}), \text{ and}$$

$$TForPBatMax=(\min(\max(\min(Ta_{Min,n},Ta_{Max,n}),Ta_{Min}),Ta_{Max}).$$

5. The torque optimization system of claim 4, wherein the reduction of the 4D torque optimization problem further comprises removing motor powers $Pa_{Min,n}$ and $Pa_{Max,n}$ from the two imposed battery power constraints to obtain modified battery power constraints PBatMinMod and PBatMaxMod as follows:

$$Pa_{ForPBatMax}=\min(Pa_{Min,n},Pa_{Man,n}),$$

$$Pa_{ForPBatMin}=\max(Pa_{Min,n},Pa_{Max,n}),$$

$$PBatMinMod=PBatMin-Pa_{ForPBatMin}, \text{ and}$$

$$PBatMaxMod=PBatMax-Pa_{ForPBatMax}.$$

6. The torque optimization system of claim 5, wherein the modified battery power constraints represent the two concentric circles having radii RMinMod and RMaxMod defined as follows:

$$\text{RMinMod}=\sqrt{}[\max(0,\text{PBatMin}-Pa_{ForPBatMin}-Cb-Cc-\text{DCLoad}], \text{ and}$$

$$\text{RMaxMod}=\sqrt{}[\max(0,\text{PBatMax}-Pa_{ForPBatMax}-Cb-Cc-\text{DCLoad}].$$

7. The torque optimization system of claim 6, wherein the objective function $f_{OBJ}$ nor the other constraints are a function of the known coordinate for motor torque Ta such that the modified battery power constraints would be affected.

8. The torque optimization system of claim 1, wherein electric motor a is part of a motor-generator unit (MGU) connected to the engine and electric motors b and c are separate electric traction motors.

9. The torque optimization system of claim 8, wherein the separate electric traction motors b and c are associated with separate front and rear axles of the REEV.

10. A torque optimization method for a range-extended electrified vehicle (REEV) having an electrified powertrain including an internal combustion engine and three electric motors a, b, and c, the torque optimization method comprising:

receiving, by a control system and from a set of sensors, a set of operating parameters of the REEV;

reducing, by the control system, a four-dimensional (4D) optimization problem for the electrified powertrain to a three-dimensional (3D) optimization problem, the 4D optimization problem defining torques generatable by the three electric motors a, b, and c and engine, wherein the reducing comprises determining modified battery power constraints representing two concentric circles having respective radii that define possible torques for electric motors b and c;

solving, by the control system the 3D optimization problem by modifying the radii based on a known torque for electric motor a, wherein electric motor a is associated with the engine;

determining, by the control system, torque commands for the electric motors b and c and the engine based on the solving of the 3D optimization problem and the set of operating parameters and determine a torque command for electric motor a; and controlling, by the control system, the electrified powertrain based on the determined torque commands.

11. The torque optimization method of claim 10, wherein the 4D torque optimization problem is defined as follows:

$$\max(C_{OBJ}), \text{ where}$$

$$C_{OBJ}=f_{OBJ}(Ta,Tb,Tc,Ti)=k_{Ta,o}*Ta+k_{Tb,o}*Tb+k_{Tc,o}*Tc+k_{Ti,o}*Ti+D,$$

where $k_{Ta,o}$, $k_{Tb,o}$, $k_{Tc,o}$, and $k_{Ti,o}$ are known scalar coefficients and D is a known scalar constant, and where $f_{OBJ}$ represents an objective function, Ta, Tb, and Tc represent the torques of the electric motors a, b and c, respectively, and Ti represents the torque of the engine i.

12. The torque optimization method of claim 11, wherein the 4D torque optimization problem also includes two imposed non-linear minimum/maximum battery power constraints that relate electric motor torque to battery power:

$$\text{PBatMin}=Pa+Pb+Pc+\text{DCLoad}, \text{ and}$$

$$\text{PBatMax}=Pa+Pb+Pc+\text{DCLoad}, \text{ where}$$

$$Pa=(A_1*Ta+A_2)^2+C_a,$$

$$Pb=(B_1*Tb+B_2)^2+C_b, \text{ and}$$

$$Pc=(C_1*Tc+C_2)^2+C_c,$$

where DCLoad represents power consumed by REEV accessories and coefficients $A_1$, $A_2$, $C_a$, $B_1$, $B_2$, $C_b$, $C_1$, $C_2$, and $C_c$ are determined empirically from electric motor loss maps.

13. The torque optimization method of claim 12, wherein the reduction of the 4D torque optimization problem comprises utilizing a known coordinate for motor torque Ta:

$$Ta_{Min,n}=(Tm_{min,n}-C_n)/k_{Ta,n}, \text{ and}$$

$$Ta_{Max,n}=(Tm_{max,n}-C_n)/k_{Ta,n},$$

to determine the following:

$$Pa_{Min,n}=(A_1*\text{TForPBatMin}+A_2)^2+C_a, \text{ and}$$

$$Pa_{Max,n}=(A_1*\text{TForPBatMax}+A_2)^2+C_a,$$

where:

$$\text{TForPBatmin}=\max(\min(\max(Ta_{Min,n},Ta_{Max,n}),Ta_{Max}),Ta_{Min}), \text{ and}$$

$$\text{TForPBatMax}=(\min(\max(\min(Ta_{Min,n},Ta_{Max,n}),Ta_{Min}),Ta_{Max}).$$

14. The torque optimization method of claim 13, wherein the reduction of the 4D torque optimization problem further comprises removing motor powers $Pa_{Min,n}$ and $Pa_{Max,n}$ from the two imposed battery power constraints to obtain modified battery power constraints PBatMinMod and PBatMaxMod as follows:

$$Pa_{ForPBatMax}=\min(Pa_{Min,n},Pa_{Man,n}),$$

$$Pa_{ForPBatMin}=\max(Pa_{Min,n},Pa_{Max,n}),$$

$$\text{PBatMinMod}=\text{PBatMin}-Pa_{ForPBatMin}, \text{ and}$$

$$\text{PBatMaxMod}=\text{PBatMax}-Pa_{ForPBatMax}.$$

15. The torque optimization method of claim 14, wherein the modified battery power constraints represent the two concentric circles having radii RMinMod and RMaxMod defined as follows:

$$\text{RMinMod}=\sqrt{}[\max(0,\text{PBatMin}-Pa_{ForPBatMin}-Cb-Cc-\text{DCLoad}], \text{ and}$$

$$\text{RMaxMod}=\sqrt{}[\max(0,\text{PBatMax}-Pa_{ForPBatMax}-Cb-Cc-\text{DCLoad}].$$

16. The torque optimization method of claim 15, wherein the objective function $f_{OBJ}$ nor the other constraints are a function of the known coordinate for motor torque Ta such that the modified battery power constraints would be affected.

17. The torque optimization method of claim 10, wherein electric motor a is part of a motor-generator unit (MGU) connected to the engine and electric motors b and c are separate electric traction motors.

18. The torque optimization method of claim 17, wherein the separate electric traction motors b and c are associated with separate front and rear axles of the REEV.

* * * * *